United States Patent [19]
Chong et al.

[11] Patent Number: 5,844,614
[45] Date of Patent: Dec. 1, 1998

[54] VIDEO SIGNAL DECODING APPARATUS

[75] Inventors: Siew Tan Chong; Sheng Mei Shen; Chee Siong Khor, all of Singapore, Singapore

[73] Assignee: Matsushita Electric Industrial Co., Ltd., Osaka-fu, Japan

[21] Appl. No.: 584,180

[22] Filed: Jan. 11, 1996

[30] Foreign Application Priority Data

Jan. 9, 1995 [JP] Japan .................................. 7-001057
Jan. 25, 1995 [JP] Japan .................................. 7-009712

[51] Int. Cl.$^6$ ....................................................... H04N 7/12
[52] U.S. Cl. .......................... 348/420; 348/699; 348/422
[58] Field of Search .................................. 348/420, 699, 348/421, 422, 423, 616, 405

[56] References Cited

U.S. PATENT DOCUMENTS

| | | | |
|---|---|---|---|
| 5,260,782 | 11/1993 | Hui ........................................ | 348/420 |
| 5,337,087 | 8/1994 | Mishima ................................ | 348/405 |
| 5,337,088 | 8/1994 | Honjo .................................... | 348/420 |
| 5,367,385 | 11/1994 | Yuan ..................................... | 348/420 |
| 5,384,849 | 1/1995 | Jeong .................................... | 348/420 |
| 5,410,350 | 4/1995 | Kato et al. .............................. | 348/421 |
| 5,481,627 | 1/1996 | Kim ....................................... | 348/616 |
| 5,528,313 | 6/1996 | Tanaka et al. .......................... | 348/699 |

FOREIGN PATENT DOCUMENTS 6-292173 10/1994 Japan .

*Primary Examiner*—Jeffrey R. Jastrzab
*Assistant Examiner*—Luanne P. Din
*Attorney, Agent, or Firm*—Wenderoth, Lind & Ponack, L.L.P.

[57] ABSTRACT

A video signal decoding apparatus according to the present invention includes a decoding unit for applying a variable length and run-length decoding to a compressed video signal to reconstruct blocks of quantized coefficients. An inverse quantizer is provided for inverse quantizing blocks of reconstructed quantized coefficients. An inverse DCT transforms the inverse quantized blocks of reconstructed quantized coefficients to produce a decoded block. An edge block detector determines whether decoded blocks are classified as an edge block. An adaptive edge enhancement filter removes the distortion in the decoded blocks when the edge block detector classifies decoded blocks as edge blocks. Thus, the video signal is decoded from the encoded video signal.

6 Claims, 14 Drawing Sheets

Fig.3A

|  |  |  |  |  |  |  |  |
|--|--|--|--|--|--|--|--|
|  | P1 | P2 | P3 |  |  |  |  |
|  | P4 | P0 | P5 |  |  |  |  |
|  | P6 | P7 | P8 |  |  |  |  |
|  |  |  |  |  |  |  |  |
|  |  |  |  |  |  |  |  |
|  |  |  |  |  |  |  |  |
|  |  |  |  |  |  |  |  |

Fig.3B

|  |  |  |  |  |  |  |  |
|--|--|--|--|--|--|--|--|
|  |  |  |  |  |  |  |  |
|  |  |  | S0 |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

Fig.7A

| 104 | 106 | 109 | 107 | 104 | 101 | 99 | 98 |
|-----|-----|-----|-----|-----|-----|----|----|
| 105 | 107 | 104 | 102 | 97  | 100 | 99 | 94 |
| 102 | 102 | 99  | 97  | 98  | 96  | 94 | 95 |
| 98  | 98  | 97  | 98  | 92  | 89  | 93 | 91 |
| 96  | 93  | 96  | 93  | 88  | 89  | 88 | 85 |
| 90  | 91  | 90  | 84  | 84  | 85  | 84 | 81 |
| 86  | 87  | 88  | 84  | 81  | 83  | 83 | 79 |
| 83  | 79  | 79  | 79  | 82  | 82  | 82 |    |

Fig.7B

| 740 | 20  | -1 | -1 | -4 | 2  | 1  | 1  |
|-----|-----|----|----|----|----|----|----|
| 60  | 6   | -2 | -3 | -1 | 0  | 1  | -2 |
| 0   | -5  | -2 | 1  | -1 | -1 | -2 | 0  |
| 3   | 4   | -4 | -1 | -2 | 0  | 2  | -1 |
| -1  | -3  | -2 | -3 | 3  | -1 | -1 | 2  |
| -1  | 0   | -2 | -3 | 1  | 3  | -1 | -1 |
| -1  | -2  | 0  | 1  | 3  | 0  | 0  | 0  |
| -1  | 0   | -1 | 0  | 0  | -4 | 3  | -1 |

Fig.8A

| 244 | 232 | 241 | 233 | 222 | 207 | 211 | 207 |
|-----|-----|-----|-----|-----|-----|-----|-----|
| 233 | 190 | 176 | 210 | 217 | 228 | 211 | 210 |
| 74  | 70  | 76  | 118 | 220 | 234 | 216 | 210 |
| 170 | 194 | 181 | 100 | 52  | 188 | 237 | 208 |
| 243 | 230 | 241 | 88  | 70  | 227 | 223 | 217 |
| 236 | 232 | 222 | 249 | 90  | 73  | 236 | 204 |
| 242 | 222 | 254 | 156 | 41  | 200 | 232 | 206 |
| 247 | 229 | 243 | 212 | 44  | 129 | 245 |     |

Fig.8B

| 1527 | 0    | 189  | -56  | -106 | 104  | 23  | -28 |
|------|------|------|------|------|------|-----|-----|
| 20   | -108 | -134 | 117  | 76   | -100 | -1  | 28  |
| 111  | 78   | -53  | -24  | 58   | 32   | -19 | -7  |
| 109  | 133  | 24   | -53  | 7    | 18   | -7  | 5   |
| 27   | 63   | 63   | 4    | -22  | -70  | 4   | 26  |
| -38  | -30  | 4    | -58  | -11  | -36  | -1  | 10  |
| -41  | -46  | -58  | -22  | -33  | 72   | 6   | -67 |
| -19  | -60  | -22  | 69   | -35  | -46  | 61  | 17  |

VIDEO SIGNAL DECODING APPARATUS

BACKGROUND OF THE INVENTION

1. Field of the Invention

The present invention relates to, more particularly, to a video signal decoding apparatus which can remove a ringing noise component included in a video signal that has been coded, using transform coding technique, for improved picture quality.

The present invention further relates to a video signal decoding apparatus for removing ringing noise components around the high frequency areas of the decoded digital data and, more particularly, to a ringing noise removing apparatus especially suitable for removing ringing digital video data that is reconstructed from decompressed video data. Therefore, there is little or no degradation in quality in other areas of the reconstructed digital video that had been processed by the apparatus mentioned above, resulting in a more pleasant visual and noise reduced output.

2. Description of the Prior Art

The digital transmission and storage of video signals and its associated audio has attracted a lot of attention recently because of the superior quality and greater flexibility available compared to the analog signal. However, as digital video pictures require a large amount of data for its representation, a constraint on its widespread use is created. Coding (compression) technique were developed to reduce the amount of data needed to represent the video signal.

Various techniques of compression have been explored for the compression of video signals. These methods are usually lossy in nature, that is, they attempt to use less amount of bits to represent the most important information present in the data such that normal viewers, of the decoded video signal, will find it difficult to detect the difference between the decoded video signal and the original non-coded signal.

One of the popular forms of compression is to apply transform coding to the digital signal to transform the digital signal from the spatial domain to another domain (for example the frequency domain). The idea behind transform coding is to make use of the energy compaction property of the transformation to decorrelate the image pixels so that redundancy in the image can be removed more efficiently in the transformed domain.

Various transformation techniques have been explored for the removal of redundancy in the spatial domain, and Discrete Cosine Transform (DCT) is found to be the best transformation from an efficiency and complexity of implementation point of view. Thus, DCT has been the core technique of a few recently established International Standardization Organization (ISO) standards for the compression of images, which include JPEG (Joint Photographic Expert Group), MPEG (Moving Picture Expert Group) Phase-1, MPEG Phase-2, h.261 (CCITT standards, used mainly for teleconferencing).

To compress an image using the DCT method, the images are divided into square blocks of pixels (for example a 8×8 pixel block) and each of these blocks is then transformed using DCT into the transformed block (8×8 also) which contains the DCT coefficients. As the neighboring pixel in an image are in general highly correlated, this enables DCT to transform image pixels into DCT coefficients that are energy concentrated in only a few of the coefficients around the top-left corner of the transformed block, which is the low frequency region. These transformed blocks are then quantified into quantized coefficients and then run-length and variable length coded to further reduce the statistical redundancy present into the run-length coded data.

The energy compaction property of DCT can be easily applied in block of pixels that are highly correlated. However, in the case of edge block, i.e. block which contains parts of edges that have sharp change in intensity across the edge, the compaction of the signal energy cannot be achieved efficiently.

With reference to FIGS. 7A, 7B, 8A, and 8B, the effect of applying DCT to blocks of pixels of different natures is described later. In FIGS. 7A and 7B, one example of a non-edge block (8×8 pixel) and its corresponding transformed block are shown, respectively. As shown in FIG. 7B, the energy is concentrated on the top-left corner of the 8×8 pixel block as a result of transformation. Quantization, run-length coding and variable length coding of this transformed block will produce little bits, and hence an efficient compression can be achieved.

In FIGS. 8A and 8B, one example of an edge block (8×8 pixel) and its corresponding transformed block are shown, respectively. As shown in FIG. 8B, the transformed edge block (FIG. 8A) has DCT coefficients that are much more randomly distributed than in the case of the edged block. Such transformed block is more difficult to quantize, run-length code and variable length code and hence the compression of the edge block cannot be preformed efficiently.

Furthermore, in order to compress more bits, the quantization parameters are designed to preserve the low frequency coefficients at the upper left corner of the block of 8×8 pixel, this design will cause more errors to be generated for an edge block when the edge block is decoded by the decoder. The error will cause a ringing effect (corona effect) appearing around the edge of the reconstructed block. This effect causes a noise component in the high frequency area of the decoded video signal, and such noise is referred to as a "ringing noise".

With reference to FIGS. 9A, 9B, 10A, and 10B, the ringing effect is described specifically. In FIGS. 9A and 9B, one example of an ideal vertical edge block and its corresponding waveform are shown, respectively. This ideal vertical edge block is Discrete Cosine Transformed (DCT), quantized, and then inverse quantized (inverse DCT) to produce the decoded block.

In FIGS. 10A and 10B, the decoded block and its corresponding wave form are shown, respectively. It can be seen that ripples R appear on both sides, shown by circles, of the edge constituting the ringing effect. As edge information is very sensitive to the human eye, in comparison with other high frequency pixel regions, distortion around the edges, i.e. the ringing noise, represents a source of irritation to the viewers.

To solve this problem, an efficient method of removing the ringing effect around the edge is disclosed in the Japanese Laid-open Patent Publication No. H6-292173 published Oct. 18, 1994, by Siew Tan Chong and entitled and assigned to the same assignee of the present invention. In this previously disclosed method, the decoded block is subject to an edge detection process which classifies the said decoded block into edge block and non-edge block, and then subjects, the edge block to an adaptive smoothing process to reduce the ringing effect.

In general, DCT has been found to be effective for the compression of digital images. However, when the block of pixels contain edges which have sharp changes in intensity, the energy compaction property of DCT is no longer valid.

This will result in a decoded edge block with a ringing effect around the edges in the block. Such distortion is annoying to the viewers as the edges provide important information to the viewers.

Such ringing effects can be removed by performing smoothing operations to the decoded blocks using a smoothing filter. However, well known smoothing filters, like the average filter and median filter, also remove the contrast of the edges, thus creating a blurring effect to the originally sharp edge. Hence, these smoothing filters are not ideally suitable for the removal of ringing effect.

Furthermore, in order to adaptively filter only those blocks which contain edge information, an edge detection algorithm needs to be designed to differentiate between an edge block from a non edge block. Most of the currently available edge detection algorithms involve many mathematical computations, for example, the use of a squaring function, a square root function or the use of surrounding blocks to help make decisions. This increases the hardware complexity necessary to implement an edge enhancement filter.

In addition to the above, over the past few years, many video compression methods have been proposed and standardized for the delivery of digital video such as MPEG-1, MPEG-2, JPEG, H.261 ect., and other proprietary standards. Most of the compression standards are deficient in nature to achieve the high compression rates. Due to this lossy nature, artifacts appear when the compressed digital video data is decompressed to reconstruct the original digital video data.

In FIGS. 18 and 19, examples of a frequency response of high frequency areas of digital video data before compression and after reconstruction are shown, respectively. As best shown in FIG. 19, the ringing noises are observed near the high frequency area of the data reconstructed from the compressed state.

To reduce or remove these artifacts, or ringing noise, postprocessing of the decompressed digital video is required. However, most of the current postprocessing methods are IIR (Infinite Impulse Response) or FIR (Finite Impulse Response) based filters which are either too complicated and costly to implement or result in degradation of the reconstructed video quality which occur when video data, not affected by noise, is altered significantly during the removal of the artifacts.

As described above, there are problems with current compression methods which cause artifacts in the reconstructed digital video data from the decompressed data. One of the more serious artifacts is the appearance of ringing noise at and around the high frequency areas of a reconstructed digital video data, as shown in FIG. 19. This usually occurs when one of the proceses in the compression methods include DCT (Discrete Cosine Transform), a lossy compression process.

An apparatus has been invented which will remove the ringing noise around the high frequency areas from the reconstructed digital video while at the same time preserving the high frequency details, thus avoiding degradation in video quality. The apparatus is simple in implementation and therefore, results only in small increase in cost when adding the apparatus as part of a postprocessing module to the decompression system for the reconstruction of digital video data from compressed data.

The aim of this invention is to provide a very simple, and yet efficient method of removing the ringing effect around the edges in the decoded blocks. This method is suitable for hardware and application specific silicon chip implementation.

SUMMARY OF THE INVENTION

The object of the present invention is therefore to provide a video signal decoding apparatus which solves the aforementioned problems.

In order to achieve the objective of the present invention, a video signal decoding apparatus for decoding a coded video signal produced by encoding an input video signal, comprises a variable length and run-length decoding means for decoding the coded bit to reconstruct said blocks of quantized coefficients; an inverse quantization means for inverse quantizing the blocks of reconstructed quantized coefficients; an inverse coding means for transforming the inverse quantized blocks of reconstructed quantized coefficients to produce a decoded block; an edge block detection means for determining whether the decoded block is classified as an edge block and an adaptive edge enhancement filter means for removing the distortion from the decoded block when the decoded block is determined as an edge block by the block edge detection means.

BRIEF DESCRIPTION OF THE DRAWINGS

These and other objects and features of the present invention will become more clear from the following description taken in conjunction with the preferred embodiments thereof with reference to the accompanying drawings in which like parts are designated by like reference numerals, and in which:

FIGS. 3A and 3B are graphs showing the pixel labelling performed by an adaptive edge enhancement filter used in the video signal decoding apparatus of FIG. 1;

FIG. 7A is a table showing coefficients of a non-edge block;

FIG. 7B is a table showing coefficients of the non-edge block that is produced by transforming the block of FIG. 7A;

FIG. 8A is a table showing coefficients of an edge block;

FIG. 8B is a table showing coefficient of the edge block that is produced by transforming the block of FIG. 8A;

DETAILED DESCRIPTION OF THE PREFERRED EMBODIMENTS (First Embodiment)

Figure 5:
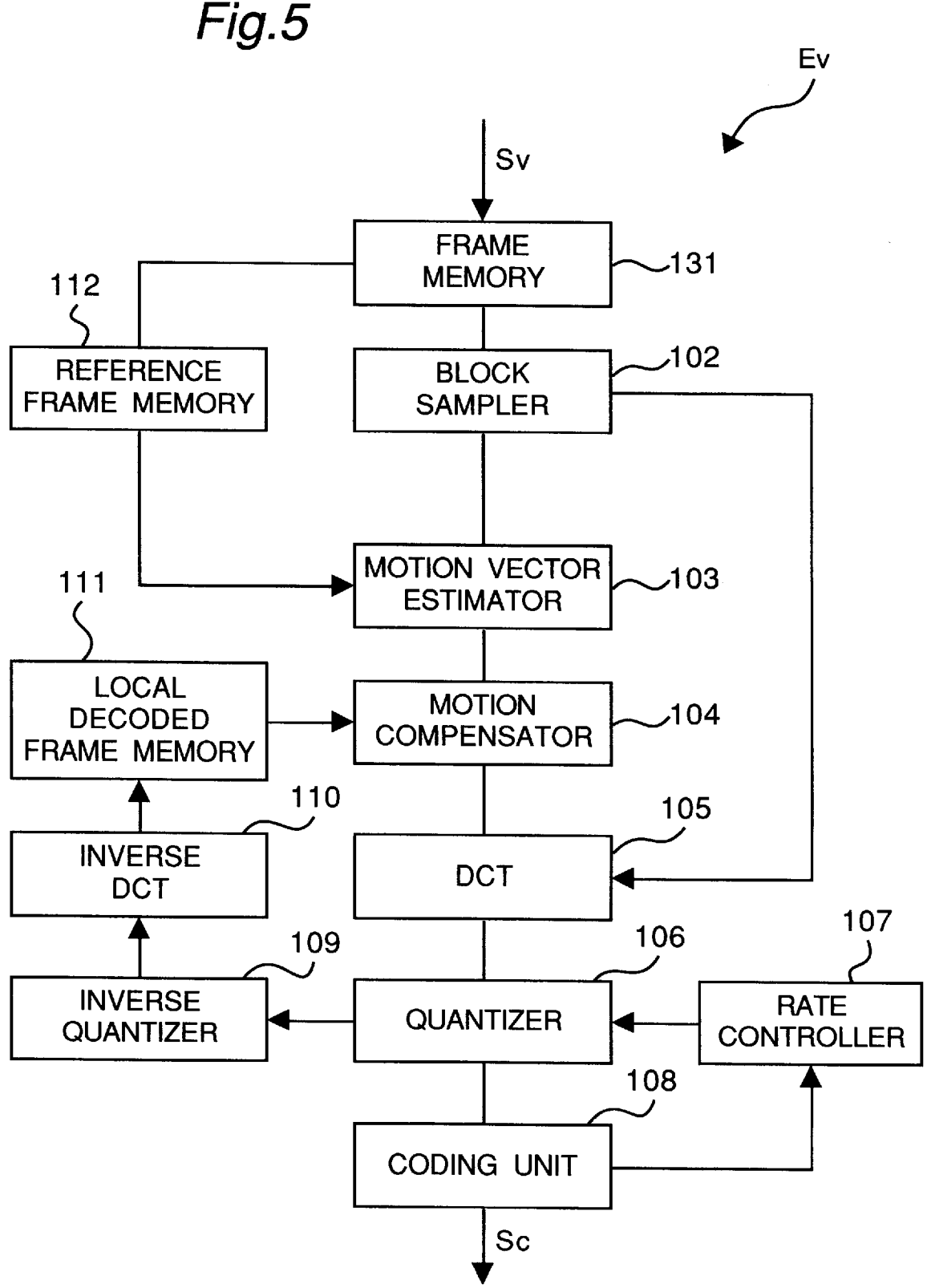
FIG. 5 is block diagram showing a video signal encoder for compressing a digital video signal into an encoded video signal.

Before describing a video signal decoding apparatus according to the present invention, an encoding of a digital video signal indicating images, by compressing thereof, into a bit stream is described. In FIG. 5, a video signal encoder Ev for compressing a digital video signal Sv into an encoded video signal Sc that is bit streams of compressed video signal Sv is shown. Note that the video signal decoding apparatus of the present invention is used for decoding that encoded video signal Sc, and applies the post-processing thereto to enhance the decoded images.

The video signal encoder Ev includes a frame memory 131, a block sampler 102, a motion vector estimator 103, a motion compensator 104, a discrete cosine transformer 105 which is indicated as "DCT", a quantizer 106, a rate controller 107, a coding unit 108, an inverse quantizer 109, an inverse discrete cosine transformer 110 which is indicated as "inverse DCT", a local decoded frame memory 111, and a reference frame memory 112, connected to each other as shown in FIG. 5. The video signal encoder Ev utilizes DCT and motion estimations and a compensation technique.

An input digital interlaced video sequence Sv first enters the frame memory 131 in a frame by frame basis. In a compression system involving motion estimation and compensation techniques, the input video frames are classified a predictive frame (P-frame) or an intra-frame (I-frame).

The I-frame is coded independently of the other frames, i.e. it is compressed without the use of any other frame. The I-frame is used periodically to allow for easy random access, fast forward/reverse and easy error recovery.

The P-frame is coded with motion estimation and compensation using previously coded frames to predict the contents of the current frame to be coded. Motion estimation and compensation are used to reduce the temporal redundancy in the digital video sequences and thereby increase the compression ratio.

When an input digital frame Sv is fed into the frame memory 131, it is also passed to the reference frame memory 112 for the motion estimation process. It is then passed to a block sampler 102. The block sampler 102 partitions the image into spatially non-overlapping blocks of pixel data. To provide a reasonable level of adaptiveness, a block size of 8×8 pixels may be used.

When the frame is classified as the I-frame, the sampled blocks are then transferred to the DCT 105 where a well known transform coding method, Discrete Cosine Transform (DCT), is performed. The pixel data is transformed to obtain a block of DCT coefficients. The obtained DCT coefficients are then transferred to the quantizer 106.

The quantizer 106 produces the quantized coefficients. The quantizer 106 uses a quantizer matrix and quantizer step size given by the rate controller 107. The rate controller 107 ensures that a fairly constant amount of data is generated per second. The quantized coefficients are then transferred to the coding unit 108 which performs a routine of the run-length coding and variable length coding of the quantized coefficients. The result of the run-length coding & variable length coding performed by the coding unit 108 is the output bit stream that is the video signal Sc bit stream to be stored or transmitted to the receiver. The coding unit 108 also transfers this bit stream to the rate controller 107.

The quantizer 106 also transfers the quantized coefficients to the inverse quantizer 109 which performs the reverse of quantization to obtain the inverse-quantization coefficients. These inverse-quantization coefficients are then transferred to inverse DCT 110 for the inverse DCT process to obtain the inverse DCT coefficients. The inverse DCT coefficients are also the decoded pixel blocks. The decoded pixel blocks are then transferred to the local decoded frame memory 111 to form the reconstructed (also referred to as "decoded") frame. The reconstructed frame will be used by the motion compensator 104 to process for the pixel block of the P-frame.

In the case of P-frames, two additional processes (compared to those done on I-frame) are performed. The block of pixel data (block to be coded) from the block sampler 102 is transferred not to the DCT 105 but to the motion vector estimator 103.

The estimator-103 estimates the motion vector by finding the best matched block from the pixel data of a pervious frame. The horizontal and vertical offset of the best matched block from the previous frame, which together form the motion vector, are obtained. The block of pixel data and its corresponding motion vector are then transferred to the motion compensator 104.

The motion compensator 104 obtains blocks of data (referred to as "predicted block") from the previously reconstructed frame based on the decoded frame output from the local decoded frame memory 111, by using the offset given by the motion vector. Differences between values of the block to be coded and the predicted block are computed to obtain a differential block composed of the different values.

When the energy (for example, calculating the standard deviation of the block) of this difference block is smaller than the energy of the block to be coded, the block will then be coded with motion compensation. Otherwise, the block to be coded will be coded as it is.

An information bit is used to indicate whether the motion compensation is done to the block. When the block is to motion compensated, this difference block is then transferred to the DCT 105 for the Discrete Cosine Transformation (DCT). Otherwise, the block to be coded will be transferred to the DCT 105. The other processes are in the same as the case of I-frames. The motion vector is also transferred as a side information, to the DCT 105, to quantization 106, and to the coding unit 108, and is then multiplexed with the variable length coded information of the difference block.

Figure 1:
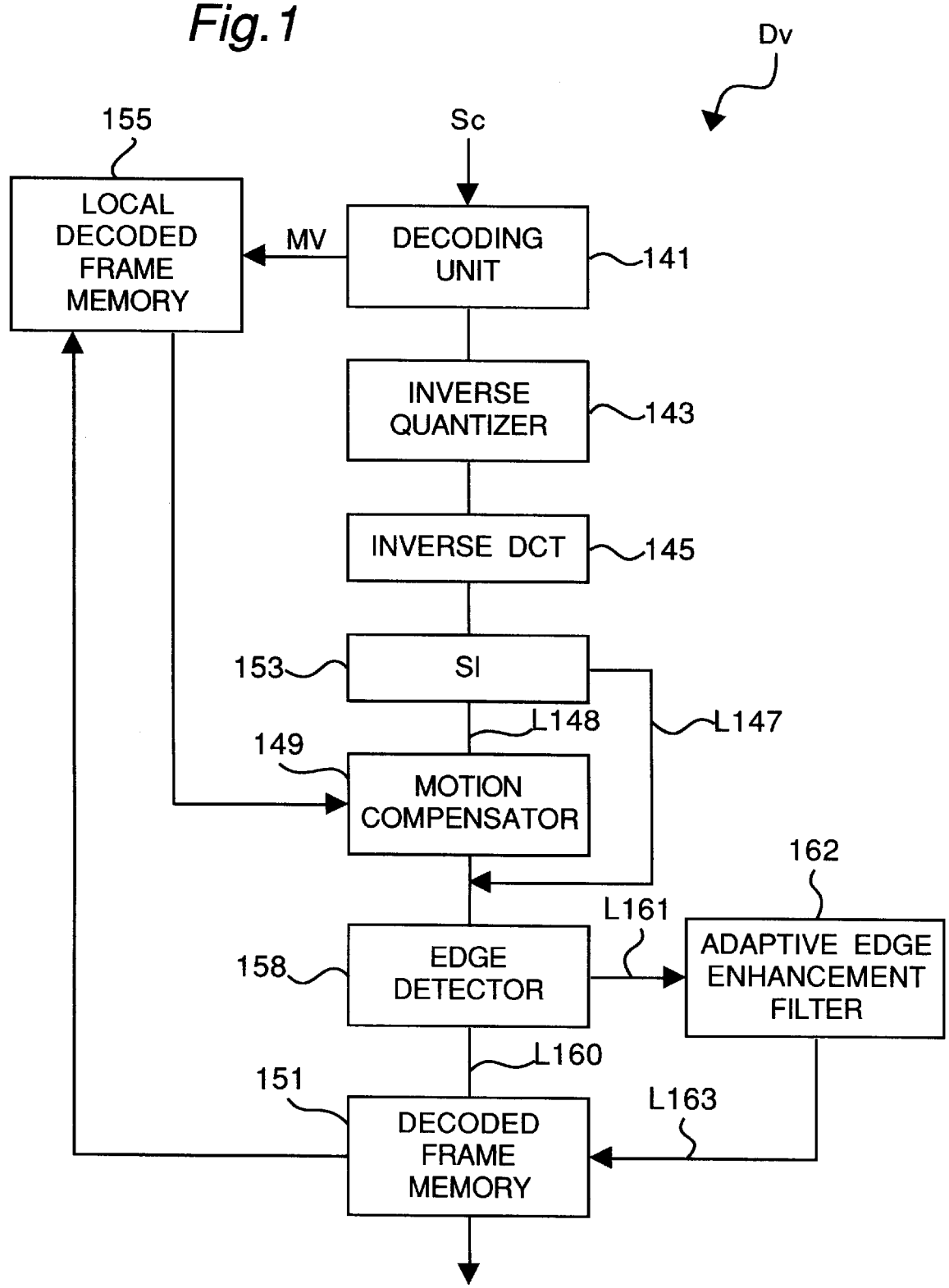
FIG. 1 is a block diagram showing a video signal decoding apparatus according to a first embodiment of the present invention.
Figure 2:
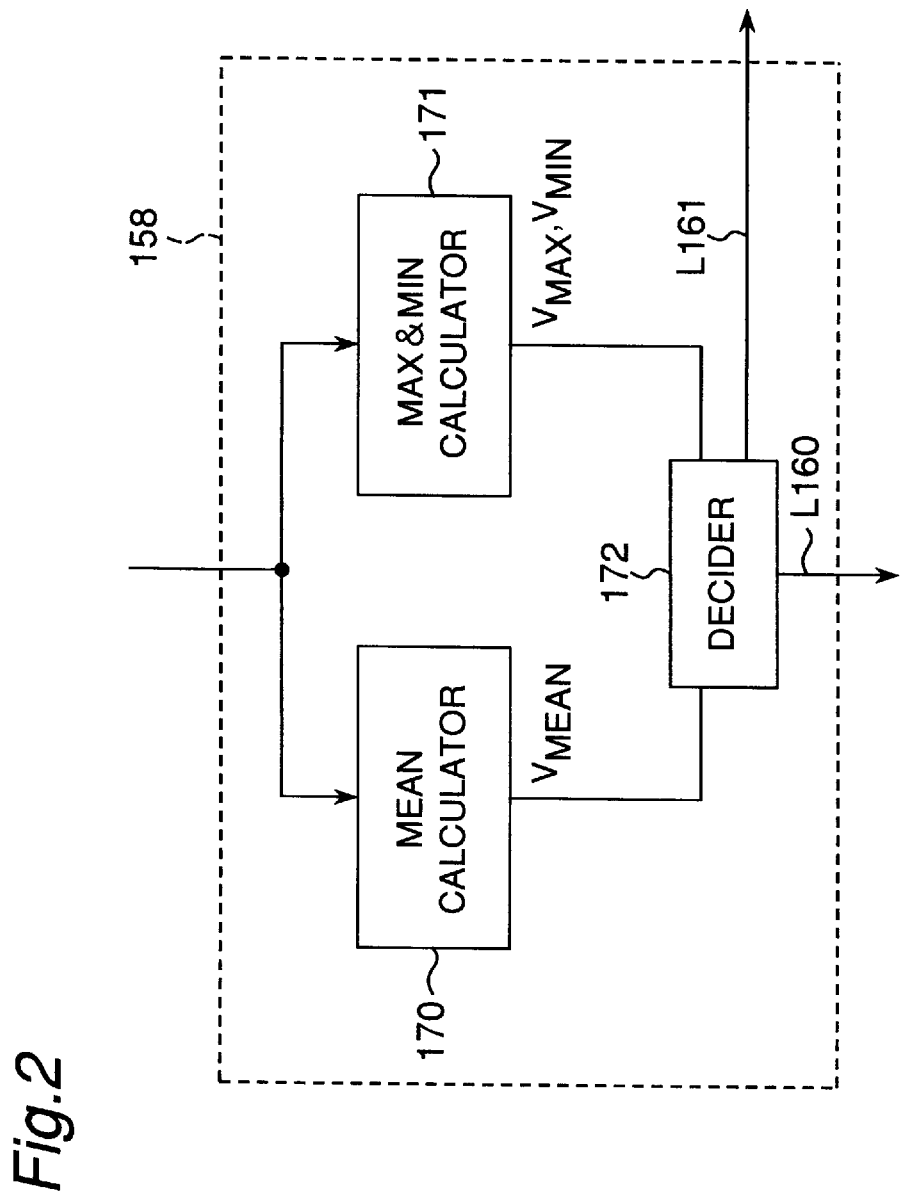
FIG. 2 is a block diagram showing an edge detector used in the video signal decoding apparatus of FIG. 1.

Referring to FIG. 1, a video signal decoding apparatus according to a preferred embodiment of the present invention is shown. The video signal decoding apparatus Dv includes a decoding unit 141, an inverse quantizer 143, an inverse discrete cosine transformer 145 indicated as "inverse DCT", a switch 153 indicated as "SI", a motion compensator 149, an edge detector 158, an adaptive edge enhancement filter 162, a decoded frame memory 151, and a local decoded frame memory 155 indicated as "LOCAL FRAME MEMORY".

The decoding unit 141 is connected to the coding unit 108 (FIG. 5) of the video signal encoder Ev for receiving the encoded video bit stream Sc. This bit stream Sc is the compressed video signal and also has coded information. The decoding unit 141 applies the encoded video signal Sc with a variable length & run-length decoding operation. Then, decoding unit 141 demultiplexes and decodes the variable length codes to produce the quantized coefficients of each block of the coded frame and the side information of the block, i.e. the motion vector MV and the information bit on whether the block is motion compensated. The decoding unit 141 also checks the frame number of the frame to be decoded to see whether the frame an I-frame or a P-frame.

The inverse quantizer 143 is connected to the decoding unit 141 for receiving the decoded quantized coefficient block and to apply an inverse quantization process.

The inverse DCT (inverse Discrete Cosine Transformer) 145 is connected to the inverse quantizer 143 for receiving the inverse quantized coefficient block and to apply an inverse discrete cosine transformation process thereto. Thus, the inverse DCT 145 produces the inverse DCT coefficient block that is a sequence of blocks of decoded pixel data.

The switch 153 is connected to the inverse DCT 145 for receiving the inverse DCT coefficient block therefrom, and receives the side information of the block from the decoding unit 141 through the inverse quantizer 143 and the inverse DCT 145. The switch 153 checks the frame number thereof to determine whether the frame to be decoded is an I-frame or a P-frame. The switch 153 has a first output port connected to the motion compensator 149 by line L148 and a second output port connected to the edge detector 158 by line L147.

For the I-frames, the switch 153 sends the output from the inverse DCT 145 directly to the edge detector 158 through line 147 for an edge detection process which will be described later in detail with reference to FIG. 4.

For the P-frames, the switch 153 checks the information bit indicating whether a block is coded with motion compensation and when it is indicated that the block output from the inverse DCT 145 had been coded without motion compensation by an encoder, such as typically shown in FIG. 5, the switch 153 sends that block directly to edge detector 158 through the line L147 and an edge detection process is again performed on the blocks of decoded pixel.

When it is indicated that the block from the inverse DCT circuit 145 had been coded with the motion compensation by such an encoder (Ev), the switch 153 sends that block to the motion compensator 149 through line L148. When the block of decoded pixel is the differential block, and a predicted block has to be obtained with a motion compensation process performed in the motion compensator 149. In such case, the switch 153 sends the output of the inverse DCT 145 to the motion compensator 149.

On the other hand, the local decoded frame memory 155 is connected to the decoding unit 141 for receiving the decoded motion vector MV to produce a predicted block using the offset given by the decoded motion vector MV.

The motion compensator 149 is also connected to the decoded frame memory 155 for receiving the predicted block therefrom. The motion compensator 149 adds the difference block recieved from the switch 153 to the predicted block from the memory 155, and produces a constructed block.

The edge detector 158 is also connected to the motion compensator 149 for receiving the reconstructed block and to apply the edge detection process.

The edge detector 158 checks whether the reconstructed block is a block containing edge information (edge block) or not (non-edge block). The edge detector 158 has a first output port connected to the adaptive edge enhancement filter 162 by a line L161 and a second output port connected to the decoded frame memory 151 by a line L160.

When the block is an edge block, the edge detector 158 transfers the block to the adaptive edge enhancement filter 162 through the line L161. The adaptive edge enhancement filter 162 performs an adaptive filtering process to remove the ringing effect and generate the filtered block. Details of the adaptive edge enhancement filter 162 will be described later with reference to FIGS. 3A and 3B. However, when the block is a non-edge block, the detector 158 transfers the block to the decoded frame memory 151 through the line L160.

The decoded frame memory 151 is also connected to the adaptive edge enhancement filter 162 by a line L163 for receiving the filtered block therefrom. The decoded frame memory 151 is further connected to the local decoded frame memory 155 for outputting the data stored therein as an output reconstructed sequence therefrom. The output reconstructed sequence is then used for motion compensation of the next frame.

The edge detector 158 includes a mean calculator 170, a maximum and minimum calculator 171 each connected to the motion compensator 149 and the switch 153 for receiving the decoded block therefrom, as described above. The mean calculator 170 calculates the mean value $V_{MEAN}$ of the block, and the maximum and minimum calculator 171 calculates the maximum value $V_{MAX}$ and the minimum value $V_{MIN}$ of the decoded block.

The edge detector 158 further includes a decider 172 connected to both the mean calculator 170 and the maximum and minimum calculator 171 for receiving the calculated values $V_{MEAN}$, $V_{MAX}$, and $V_{MIN}$ therefrom. The decider 172 obtains a first absolute difference Da1 between the maximum value $V_{MAX}$ and the mean value $V_{MEAN}$ and a second absolute difference Da2 between the minimum value $V_{MIN}$ and the mean value $V_{MEAN}$.

Then, the decider 172 compares the obtained absolute differences Da1 and Da2 with a first threshold Th1 that is a predetermined value suitable for determining the block to be smoothed, and is chosen to be "48" in this embodiment. When either of the first or second absolute differences Da1 or Da2 is greater than the first threshold Th1, the decider 172 judges that the decoded block is an edge block. Otherwise, the decider 172 judges the decoded block as a non-edge block. According to this judgment, the decider 172 selectively transfers the decoded blocks either to the adaptive edge enhancement filter 162 or the decoded frame memory 151, as described above.

Figures 3A, 3B:
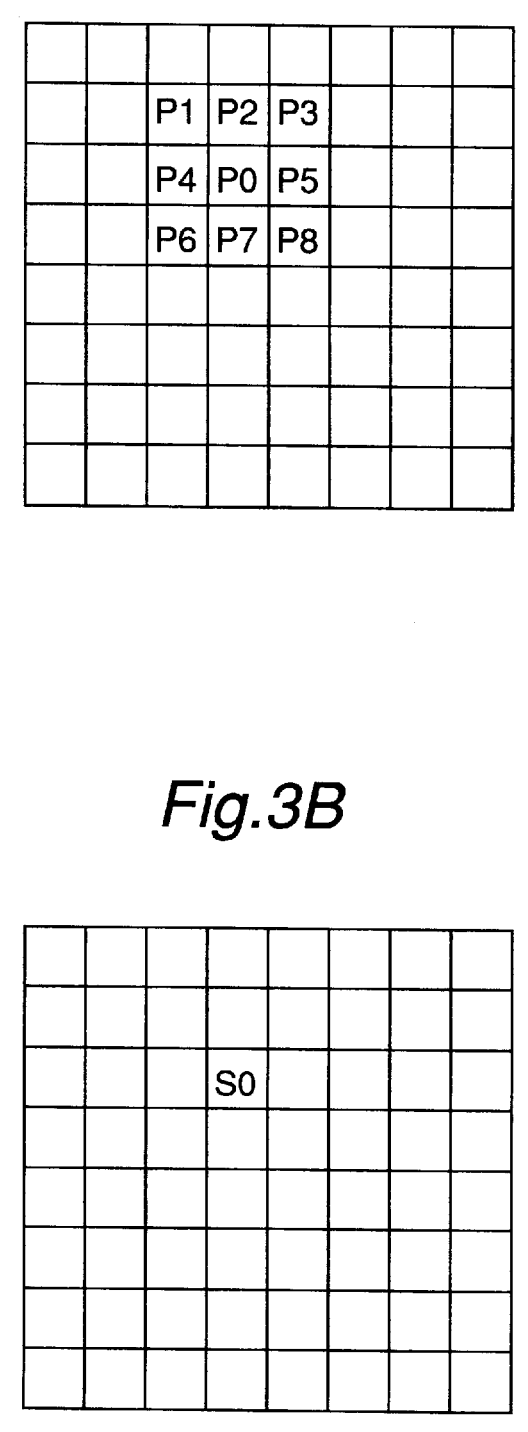

With reference to FIGS. 3A and 3B, the pixel labelling performed by the adaptive edge enhancement filter 162 of FIG. 1 is described briefly. In FIG. 3A, the blocks of pixels on the left is the 8×8 decoded block which has been classified as an edge block is shown. In FIG. 3B, the post-processed block of the edge block of FIG. 3A is shown. The adaptive filter is applied to the pixel values of the decoded block one at a time, starting from the top-left corner, going horizontally and ending at the bottom-right corner.

For every pixel value, the corresponding filtered value is stored in the processed edge block of FIG. 3B. For example, a pixel at the 3rd row and the 4th column of the edge block of FIG. 3A, which is represented by P0, is targeted, the adaptive filter uses its surrounding pixels (P1, P2, P3, . . . P8) to generate a post-processed value S0 which is stored in the processed edge block (FIG. 3B). Note that each of 9 pixels having a target pixel P0 and surrounding 8 pixels can be represented by reference Pi, wherein "i" is a positive integer smaller than 9 and including 0, as shown.

Figure 4:
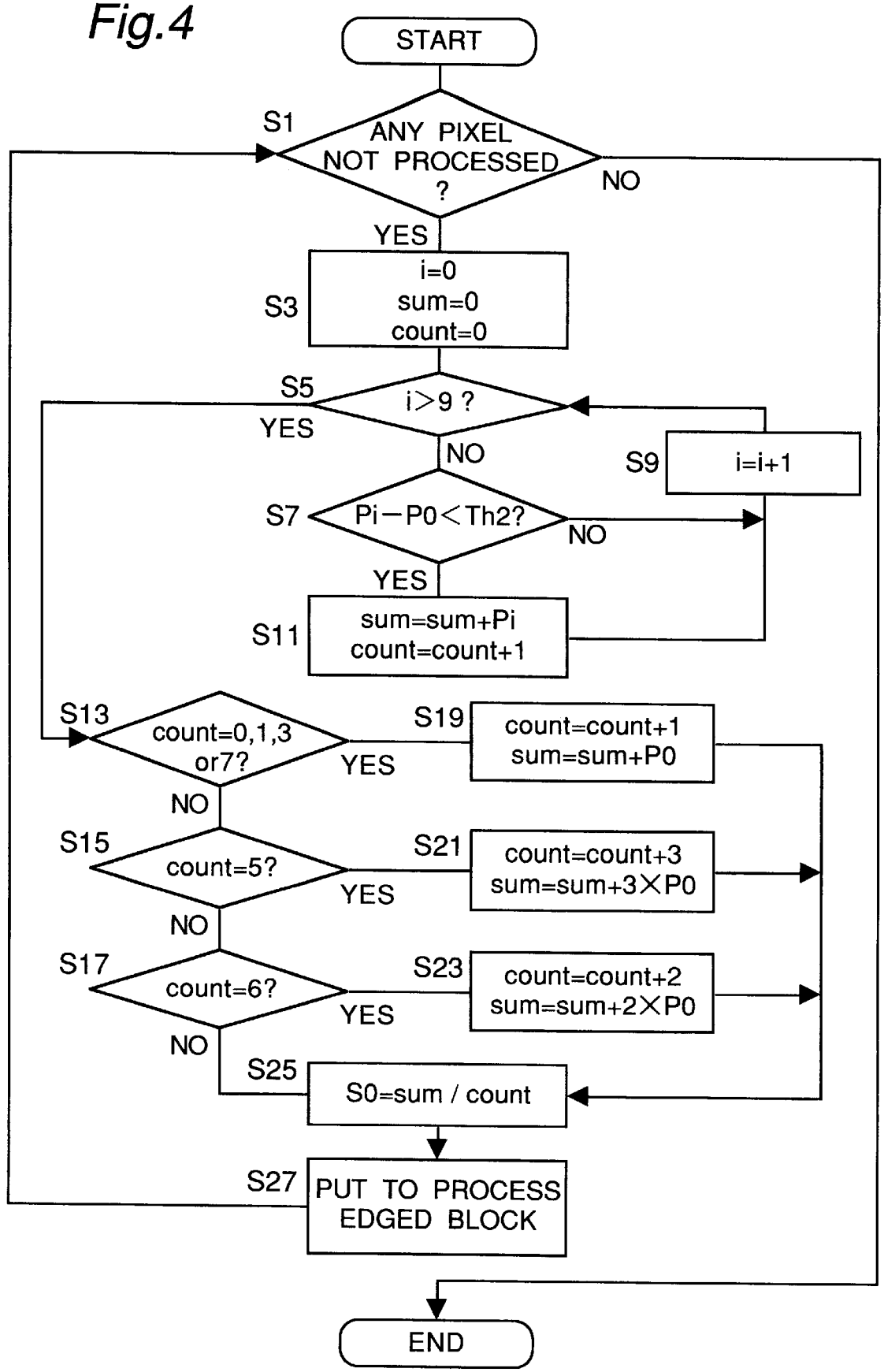
FIG. 4 is a flow chart showing the operation of a ringing noise filter used in the video signal decoding apparatus of FIG. 1.

Referring to FIG. 4, an operation of the adaptive edge enhancement filter 162 is shown. When every edge block enters into the adaptive edge enhancement filter 162, the adaptive edge enhancement routine starts processing the edge block on a pixel-by-pixel basis. Each pixel is adaptive filtered using the surrounding pixels.

At step S1, a judgement is made as to whether any pixel not processed is rested in the edge block. When all pixels in the block have been processed, a judgement of "NO" is made. Then the procedure terminates. However, when the newly entered block has pixels not processed, a judgement of "YES" is made. Then, the procedure advances to step S3 for processing.

At step S3, all of parameters "i", "sum", and "count" are set to 0. Thus, the center pixel P0 shown in FIG. 3A is set as the target pixel for processing. The procedure advances to the next step S5.

At step S5, a judgement is made as to whether "i" is smaller than 9 or not. When "i" is smaller than 9, it means that any of the surrounding 8 pixels are still not examined. Then, a judgement of "NO" is made and the procedure advances to step S7.

At step S7, a judgement is made as to whether the difference between the center pixels P0 and its surrounding pixel Pi is smaller than a second threshold Th2 having a predetermined value. When the difference (Pi−P0) is smaller than the second threshold Th2, meaning that the center pixel P0 and that particular surrounding pixel Pi are on the same side of the edge in the image, a judgement of YES is made and the procedure advances to step S11.

At step S11, the value of count is increased by 1 and the value of Pi is also added to the sum. Then the procedure advances to step S9.

At step S9, "i" is incremented by 1, and then the procedure returns to step S5. Thus, the relationship between the center pixel P0 and the next surrounding pixel Pi is examined.

At step S7, when a judgement of NO is made, it means that the difference (Pi−P0) is equal to or greater than the second threshold Th2. The procedure then advances to step S9.

However, when "i" becomes 9 as a result of addition at step S9, a judgement of YES is made at step S5. Then the procedure advances to step S13. Thus, the loop of step S5, S7, S11, and S9 is repeated until all the surrounding eight pixels are scanned.

At step S13, a judgement as to whether the value of count is equal to either 0, 1, 3, or 7 is made. When this is judged "YES", the procedure advances to step S19.

At step S19, the count is incremented by 1, and the center pixel P0 is added to the sum. Then, the procedure advances to step S25.

However, when the judgement is "NO" at step S13, this indicates that count is equal to neither 0, 1, 3, or 7. The procedure advances to step S15.

At step S15, a judgment is made as to whether the value of count is equal to 5. When the count is equal to 5, a judgment of YES is made. Then the procedure advances to step S21.

At step S21, the count is incremented by 3. Then a value of three times the center pixel P0 is added to the sum. Then the procedure advances to step S25.

However, when a judgement of NO is made at step S15, the procedure advances to step S17.

At step S17, a judgement is made as to whether the value of count is equal to 6. When a judgement of YES is made, the procedure advances to step S23.

At step S23, the count is increased by 2 and a value of two times the center pixel P0 is added to the sum. Then, the procedure advances to step S25.

However, at step S17, a judgement of NO is made, the procedure advances to step S25.

At step S25, the post-processed block S0 is calculated by taking the division of sum by count. In this embodiment, the second threshold Th2 is set to be 16, but can be chosen to any predetermined value which enables the surrounding pixels on the same side of the edge to be smoothed. Then, the procedure advances to step S27.

At step S27, the post-processed block S0 is put to process the edged block, and then the procedure returns to step S1 so as to examine the next block.

As apparent from the above description, by performing the adaptive smoothing function on the detected edge blocks, the ringing (corona) effects can be reduced significantly. The subjective quality of the decoded video sequences, after passing being passed through the post-processing filter, have been shown to be improved compared to those not subjected to the post-processing filter.

Figure 6A:
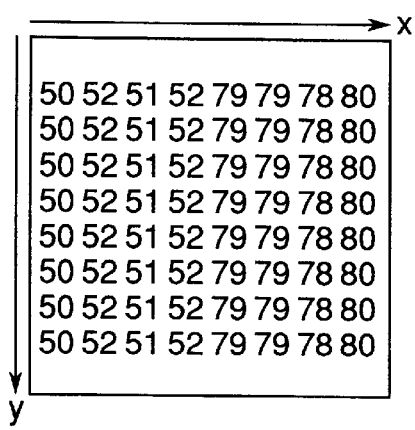
FIG. 6A is a table showing coefficients of a coded edge block according to the present invention.
Figure 6B:
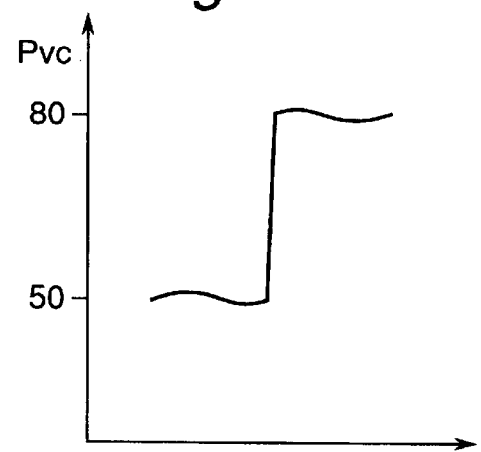
FIG. 6B is a graph showing a waveform corresponding to the coded edge block of FIG. 6A according to the present invention.
Figure 9A:
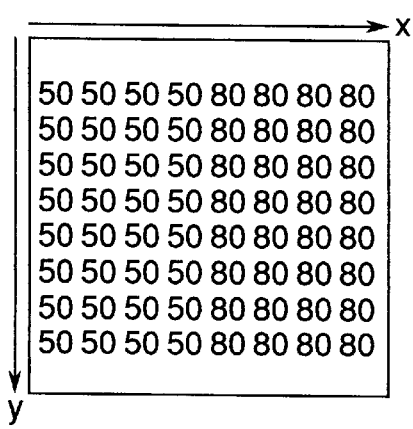
FIG. 9A is a table showing coefficients of an ideal vertical edge block.
Figure 9B:
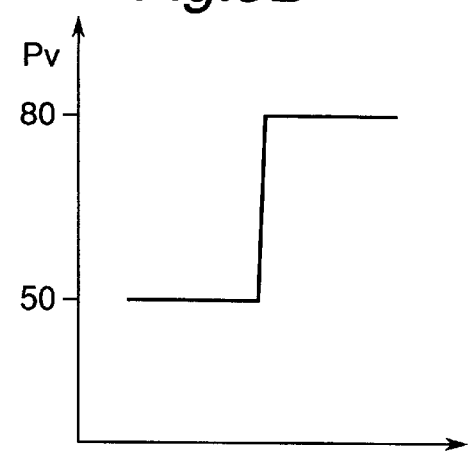
FIG. 9B is a graph showing a waveform of the vertical edge block of FIG. 9A.
Figure 10A:
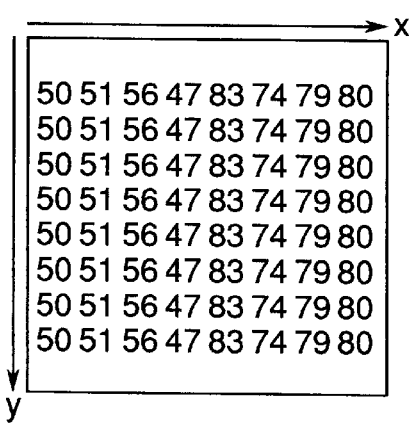
FIG. 10A is a table showing coefficients of edge block that is produced by decoding the ideal vertical edge block of FIG. 9A.
Figure 10B:
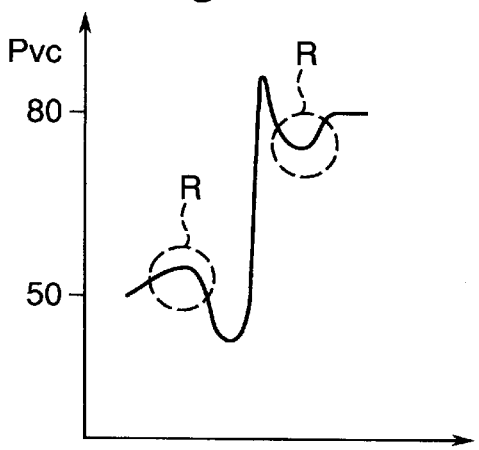
FIG. 10B is a graph showing a wave form of the decoded edge block of FIG. 10A.

Referring to FIGS. 6A and 6B, the post-processed edge block, according to the present invention, and its corresponding waveform are shown, respectively. As shown in FIG. 6B, the post-processed block has a significantly reduced ringing effect. With reference to the MPEG, JPEG and H.261 coding standards, performing the smoothing function on the coded picture means that no extra information needs to be transmitted by the coder to the decoder and hence no change in the bit-syntax is needed.

Thus, the effects of applying this method is that corona noise around the edge is reduced significantly while no further information needs to be transmitted to the decoder, and no change to the existing MPEG, JPEG and H.261 coding standards is required. By using a simple edge detection method that is tightly coupled to the simple adaptive averaging operation to process the edge block, a hardware implementation of the method is also made very simple.

According to the present invention, the first step in the operation is to take the decoded block from the decoder and pass it through an edge detection circuit to determine if the decoded block contains any edge information. If edge information is present in the block, the block is classified as an edge block; otherwise, it is classified as non-edge block.

Then, the edge block is passed through a smoothing filter circuit which performs an averaging process, adaptively, by using only neighboring pixels from the same side of the edge for the averaging process. The neighboring pixels are classified as being either on the same side of the edge as the pixel to be smoothed or on a different side of the edge using a thresholding technique. If the value of neighboring pixels differ from the pixel to be smoothed by less than the threshold value, it is classified as being on the same side of the edge as the pixel to be smoothed; otherwise, it is classified as being on a different side of the edge to be smoothed. The averaging process then uses only those neighboring pixels which are on the same side as the pixel to be smoothed for the calculation of the average value.

(Second Embodiment)

Figure 11:
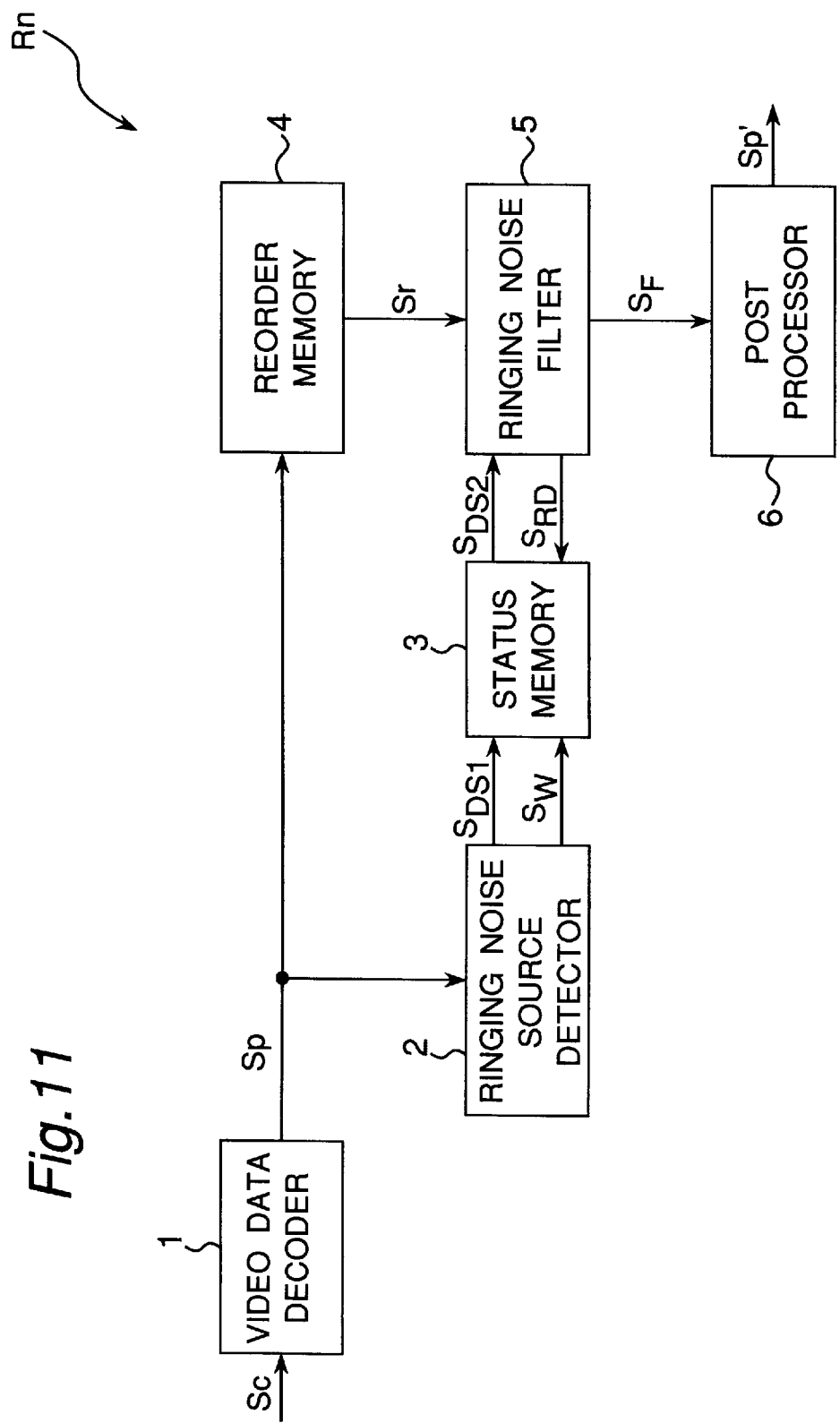
FIG. 11 is a block diagram showing a ringing noise removing apparatus according to a second embodiment of the present invention.

Referring to FIG. 11, a ringing noise removing apparatus according to a second embodiment of the present invention is shown. In FIG. 11, the ringing noise removing apparatus Rn includes a video data decoder 1, a ringing noise source detector 2, a status memory 3, a recorder memory 4, a ringing noise filter 5, and a post processing unit 6.

The video data decoder 1 is provided for receiving a compressed video data Sc from a suitable data source such as a digital video cassette recorder. The video data decoder 1 decompresses the compressed data Sc so as to reconstruct the original video data Sp. This reconstructed data Sp is outputted from the video data decoder 1 at random and at a high transfer rate, and is arranged in a block format having a matrix formed by 8×8 pixels, for example.

The ringing noise source detector 2 is connected to the vide data decoder 1 for receiving the video pixel data Sp therefrom so as to detect the ringing noise components included in the data Sp thereby producing a first detection level signal $S_{DS1}$ and a writing command signal $S_W$.

The status memory 3 is connected to the ringing noise source detector 2 for receiving the signals $S_{DS1}$ and $S_W$ therefrom so as to store the detection status of the pixel data.

The reorder memory 4 is connected to the video data decoder 1 for receiving the pixel data Sp therefrom. The reorder memory 4 reorders frames of the pixel data Sp so as to convert thereof from the block format into a raster scan format. Thus, the pixel data Sp is converted into a raster scan pixel data Sr which is suitable for raster scanning and other purposes.

The ringing noise filter 5 is connected to the status memory 3 and the reorder memory 4 for receiving the signals (data) $S_{DS2}$ and Sr therefrom, respectively. The ringing noise filter 5 filters ringing noise components from the data Sr with respect to the signal $S_{DS2}$, and further produces the reading command signal $S_{RD}$. The ringing noise filter 5 is further connected to the status memory 3 for feeding the signal $S_{RD}$ back thereto. Then, the ringing noise filter 5 outputs a ringing noise filtered data $S_F$ whose ringing noise components are removed therefrom.

The post processor 6 is connected to the ring noise filter 5 for receiving the filtered pixel data $S_F$ so as to apply post-processing such as interpolation, and to produces a pixel data Sp' which is the reproduction of the original pixel data.

Figure 12:
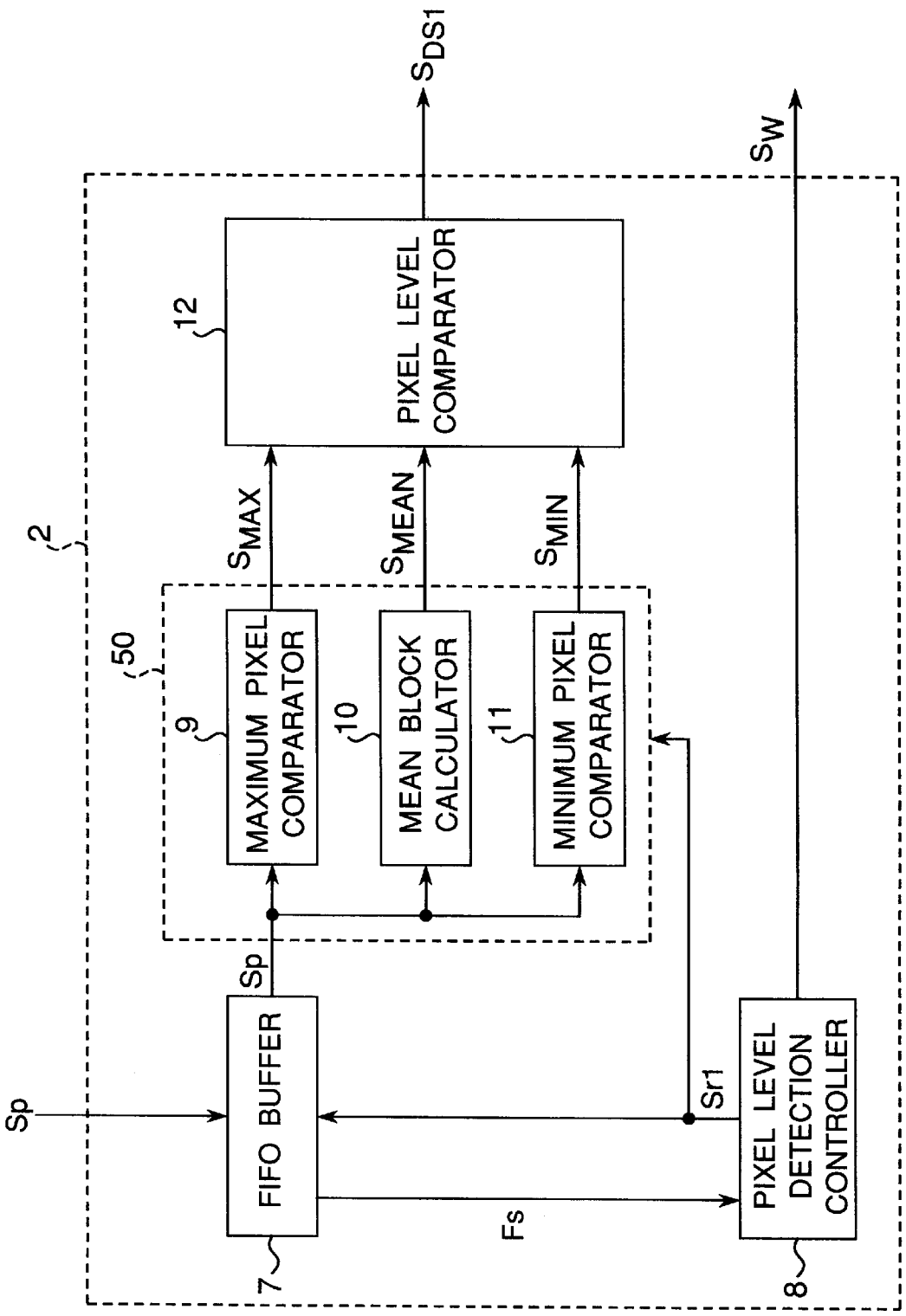
FIG. 12 is a block diagram showing a ringing noise detector used in the ringing noise removing apparatus of FIG. 11.

Referring to FIG. 12, the ringing noise source detector 2 incorporated in the ringing noise removing apparatus Rn is shown. The detector 2 includes a First In First Out buffer memory 7, hereinafter referred to as "FIFO buffer", connected to the video data decoder 1 for receiving the reconstructed pixel data Sp therefrom. The FIFO buffer 7 outputs the received pixel data Sp therefrom in the same order in which recieved by the FIFO buffer 7. Furthermore, the FIFO buffer 7 produces a flag signal Fs which indicates whether the pixel data Sp is currently present therein.

A pixel level detection controller 8 is connected to the FIFO buffer 7 for receiving the flag signal Fs to check the status of FIFO buffer 7. The controller 8 produces a reading signal Sr1 and the writing command signal $s_W$ when the flag signal Fs indicates that the FIFO buffer 7 current has data Sp therein. The pixel level detection controller 8 is also connected to the FIFO buffer 7 for transferring the reading command signal Sr1 thereto so as to output the reconstructed data Sp therefrom.

A pixel level detector 50 is connected to the FIFO buffer 17 and the pixel level detection controller 8 for receiving the reconstructed data Sp and the reading command signal Sr1 therefrom, respectively. The pixel level detector 50 detects the pixel level of the reconstructed data Sp outputted from the FiFO buffer with respect to the reading command signal Sr1. The pixel level detector 50 includes a maximum pixel comparator 9, a mean block calculator 10, and a minimum pixel comparator 11 each of which are connected to the FIFO buffer 7 and the pixel level detection controller 8, respectively, as shown in FIG. 12.

The maximum pixel comparator 9 checks and compares all the pixels in the reconstructed block data Sp to detect the maximum value thereof, and further produces a first level signal $S_{MAX}$ with respect to the reading signal Sr1. The reading signal Sr1 is used as a clock signal for the reading operation. Similarly, the minimum pixel comparator 11 checks and compares all pixels in the reconstructed block data Sp for the minimum value, and produces a second signal $S_{MIN}$. The mean block calculator 10 calculates an average value of the pixels in the block Sp, and produces a third signal $S_{MEAN}$. Note that the reading signal Sr1 is used as an output clock for the FIFO buffer 7 and the pixel level detector 50.

Specifically, when the detection controller 8 read one block of pixel data Sp from the FIFO buffer 7 by the reading signal Sr1, the reading cycle will stop and each data at the output of comparators 9, 10, and 11 is the final output for that block. Thus, three level signals $S_{MAX}$, $S_{MIN}$, and $S_{MEAN}$ are produced, and are transferred from the level detector 50.

A pixel level comparator 12 is connected to the pixel level detector 50 for receiving the level signals $S_{MAX}$, $S_{MIN}$, and $S_{MEAN}$ therefrom. Base on these level signals, the pixel level comparator 12 completes the final computation to determine the detection status of the block data Sp being examined, and produces a first detection level signal $S_{DS1}$.

Figure 13:
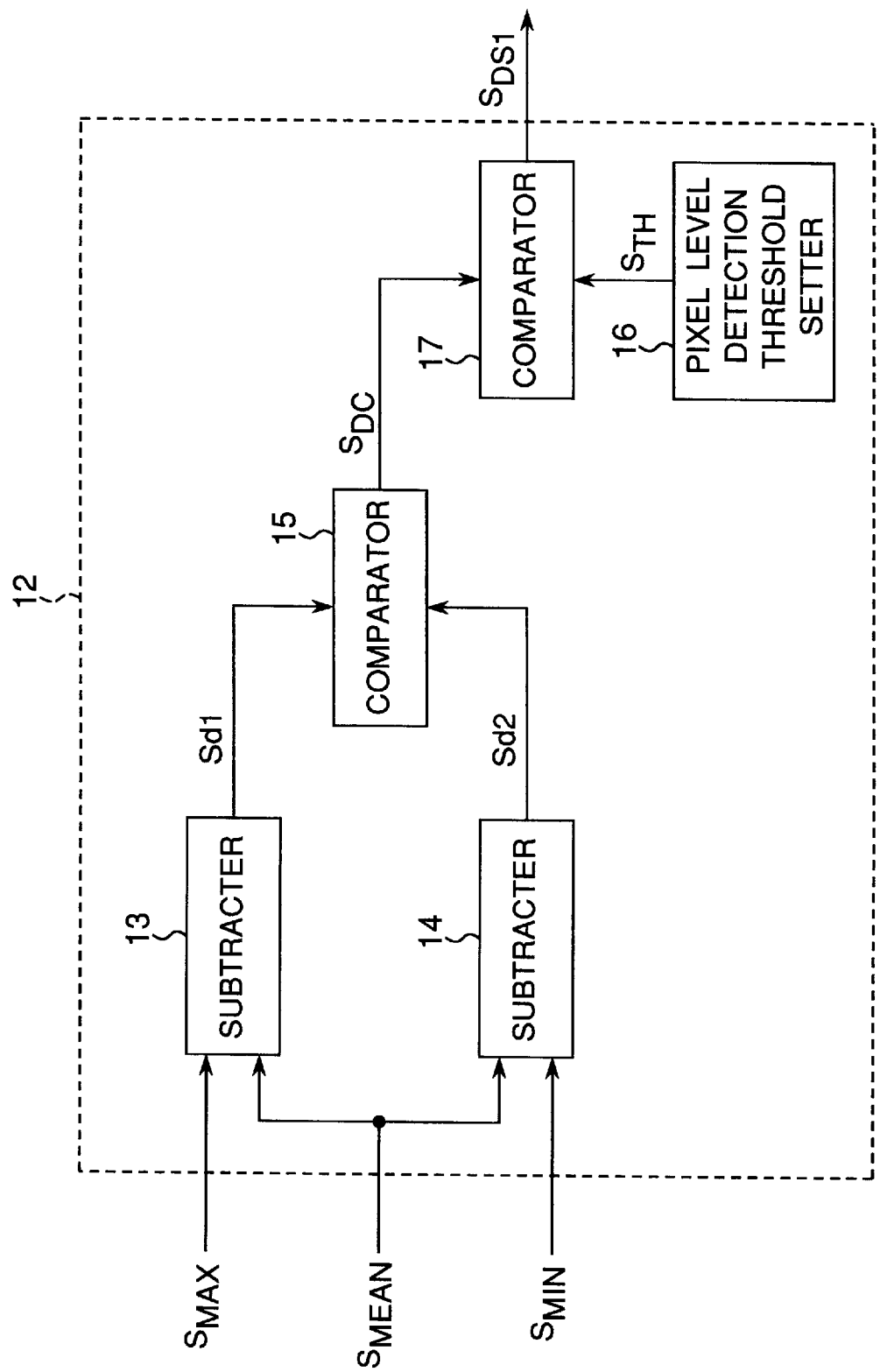
FIG. 13 is a block diagram showing a pixel level comparator used in the ringing noise source detector of FIG. 12.

Referring to FIG. 13, the pixel level comparator 12 is shown. The pixel level comparator 12 includes a first subtracter 13, a second subtracter 14, a first comparator 15, a pixel level detection threshold setter 16, and a second comparator 17. The threshold setter 16 produces a threshold signal $S_{TH}$ having a predetermined value, or can store the threshold signal $S_{TH}$ supplied from an external means such as a keyboard operated by an operator.

The first subtracter 13 is connected to the maximum pixel comparator 9 and the mean block calculator 10 of the pixel level comparator 12 for receiving the signals $S_{MAX}$ and $S_{MEAN}$ therefrom, respectively. The second subtracter 14 is connected to the mean block calculator 10 and the minimum pixel comparator 11 of the pixel level comparator 12 for receiving the signals $S_{MEAN}$ and $S_{MIN}$ therefrom, respectively. Note that the mean value is essentially less than or equal to the maximum value, and is greater than or equal to the minimum value of the data block pixels Sp. Therefore, the first subtracter 13, subtracts the mean value signal $S_{MEAN}$ from the maximum value signal $S_{MAX}$ to produce a first difference signal Sd1. Similarly, the second subtracter 14 subtracts the minimum value signal $S_{MEAN}$ from the mean value signal $S_{MIN}$ to produce a second difference signal Sd2.

The first comparator 15 is connected to the subtracters 13 and 14 for receiving the difference signals Sd1 and Sd2, respectively, to compare thereof. The first comparator 15 multiplexes either one of the two difference signals Sd1 and Sd2 having a greater value to output as a comparison signal $S_{DC}$ therefrom. The comparison signal $S_{DC}$ is a direct current.

The second comparator 17 is connected to the first comparator 15 and the pixel level detection threshold setter 16 for receiving the signal $S_{DC}$ and the threshold signal $S_{TH}$ therefrom, respectively. The comparator 17 compares the comparison signal $S_{DC}$ with the threshold signal $S_{TH}$ to produce and output the first detection level signal $S_{DS1}$ therefrom.

According to this embodiment, when the comparison result signal $S_{DC}$ is greater than the threshold signal $S_{TH}$, a judgement of that the block of pixels being examined have ringing noise to be filtered around the high frequency areas thereof. In this sense, the first detection level signal $S_{DS1}$ can be regarded as a pixel status signal indicating the status of the ringing noise in the block pixels.

Referring back to FIG. 11, the status memory 3 is connected to both the pixel level comparator 12 and the pixel level detection controller 8 of the ringing noise detector 2 for receiving the first detection level signal $S_{DS1}$ and the writing command signal $S_W$ therefrom, respectively. The status memory 3 stores the signal $S_{DS1}$ together with the writing command signal SW therein. The operation of the status memory 3 will be described later with respect to the ringing noise filter 5 below.

Figure 14:
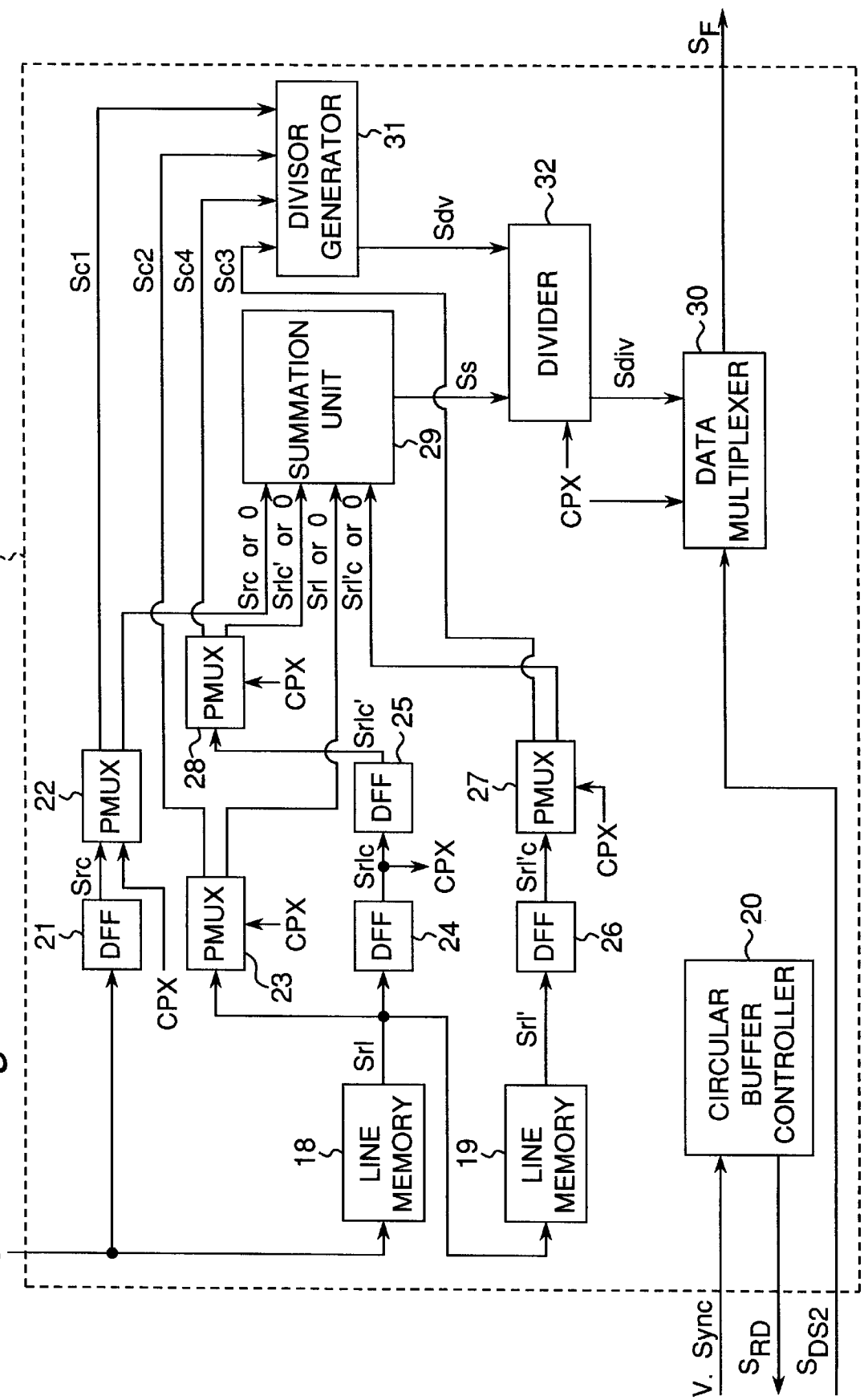
FIG. 14 is a block diagram showing a ringing noise filter used in the ringing noise removing apparatus of FIG. 11.

Referring to FIG. 14, details of the ringing noise filter 5 of FIG. 11 are shown. The circuitry is synchronous and is clocked by the operation clock that is a vertical synchronization signal V. Sync. The ringing noise filter 5 includes first and second line memories 18 and 19 each having a memory length equal to the number of pixel data in one raster scan line.

The first line memory 18 is connected to the reorder memory 4 for receiving the raster scan pixel data Sr and to delay it by one line, and thus producing a first delayed pixel data Srl. This data Srl is delayed from the pixel data Sr by one line period.

The second line memory 19 is connected to the first line memory 18 for receiving the first delayed pixel data Srl therefrom to also delay by one line, and then produces a second delayed pixel data Srl'. This data Srl' is delayed from the pixel data Sr by one line period.

Four 8-bit registers, entitled as DEF 21, 24, 25, and 26 in FIG. 14, are provided. The first register 21 is connected to the reorder memory 4 for receiving the raster scan pixel data Sr to delay by one operation clock, and thus producing a third delayed data Src. This data Src is delayed from the pixel data Sr by one clock period.

The second register 24 is connected to the first line memory 18 for receiving the second delayed pixel data Srl therefrom to delay by one clock, and thus producing a fourth delayed pixel data Srlc. This data Srlc is delayed from the data Sr by one line and one clock period.

The third register 25 is connected to the second register 24 for receiving the fourth delayed pixel data Srlc therefrom to delay thereof by one clock, and thus producing a fifth delayed pixel data Srlc'. This data Srlc' is delayed from the data pixel Sr by one line and two clocks period.

The fourth register 26 is connected to the second line memory 19 for receiving the second delayed pixel data Srl' to delay thereof by one clock, and thus producing a sixth delayed pixel data Srl'c. This data Srl'c is delayed from the data Sr by two lines and one clock period.

It is noted that the fifth delayed pixel data Srlc indicates the pixel data to be filtered and the center pixel of a filter matrix which is referred to as "a center pixel signal CPX". Specifically, pixels contributing to the computation of the filtering of the center pixel are one line ahead of it at the output of the fourth register 26, one clock ahead at the output of the third register 25, one clock delayed at the line memory 18 output, and one line delayed at the output of DFF 21.

Four pixel multiplexers that are entitled as PMUX 22, 23, 27 and 28, respectively, in FIG. 14 are provided. These multiplexers 22, 23, 27 and 28 have an identical circuitry, as typically shown in FIG. 15. The first pixel multiplexer 22 is connected to the first 21 and second 24 registers for receiving the third delayed pixel data Src and the center pixel signal CPX (Srlc), and for producing a first comparison signal Sc1.

Figure 15:
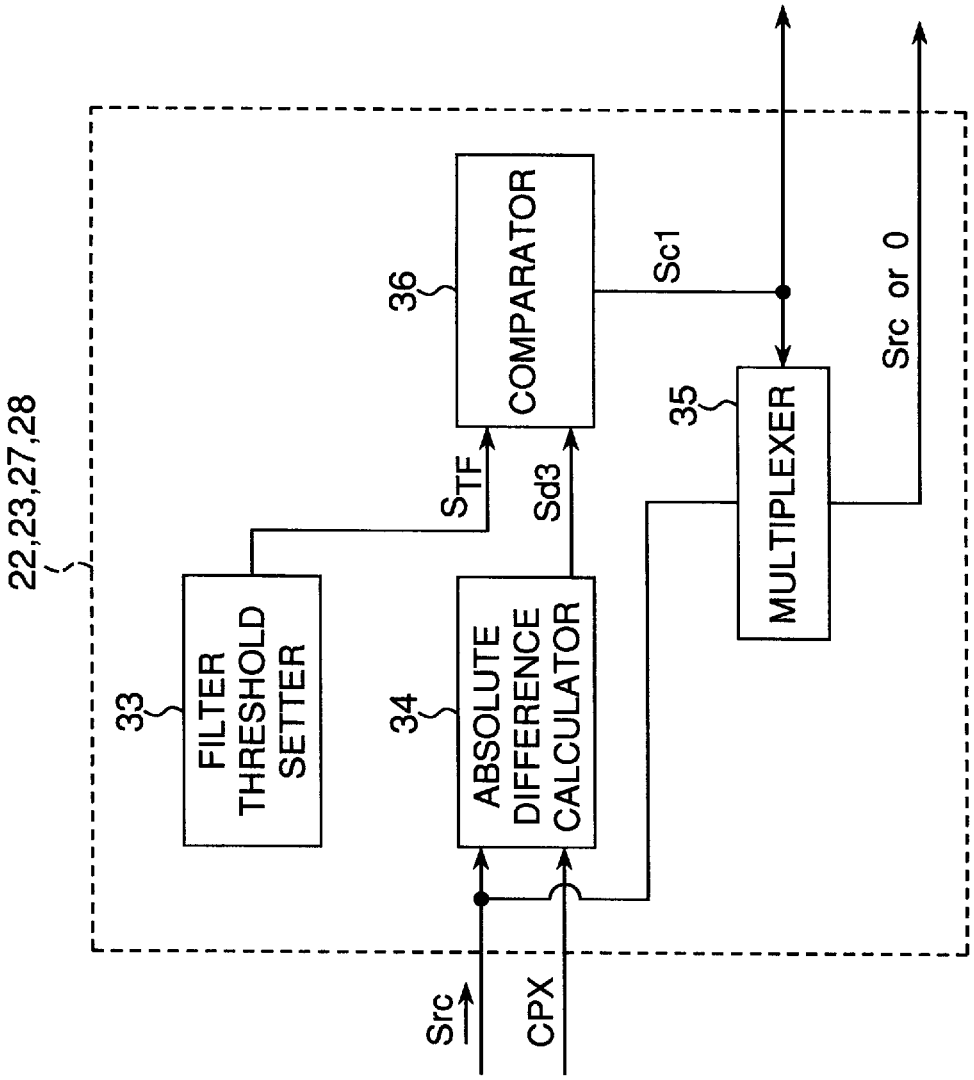
FIG. 15 is a block diagram showing a construction of pixel selectors incorporated in the ringing noise filter of FIG. 14.

Referring to FIG. 15, the construction of first pixel multiplexer 22 is shown, as a representative example of the multiplexers 22, 23, 27 and 28. The pixel multiplexer 22 includes a filter threshold setter 33, an absolute difference calculator 34, a multiplexer 35, and a comparator 36. The filter threshold setter 33 produces a threshold signal $S_{TF}$ having a predetermined value, or can store the threshold signal $S_{TF}$ supplied from an external means such as a keyboard operated by an operator.

The absolute difference calculator 34 is connected to the first register 21 and the second register 24 for receiving the third delayed pixel data Src and the center pixel signal CPX therefrom, respectively. The calculator 34 calculates an absolute difference between the two data Src and CPX to produce a third difference signal Sd3.

The comparator 36 is connected to the filter threshold setter 33 and the absolute difference calculator 34 for receiving the filter threshold signal $S_{TF}$ and the third difference signal Sd3 therefrom, respectively. The comparator 36 compares the signals $S_{TF}$ and Sd3 to produce the first comparison signal Scd having levels "0" and "1". For example, when the absolute difference Sd3 is greater than the threshold $S_{TF}$, the comparison signal Sc1 has a "1" level, and otherwise has a "0" level.

The multiplexer 35 is connected to the first register 21 and the comparator 36 for receiving the third delayed pixel data Src and the first comparison signal Sc1 therefrom, respectively. When the absolute difference Sd3 is greater than the filter threshold $S_{TF}$, the multiplexer 35 outputs the pixel data Src. However, when the absolute difference Sd3 is not greater than the threshold $S_{TF}$, the multiplexer 35 outputs a zero value signal.

Referring back to FIG. 14, a summation unit 29 is connected to the multiplexer 35 of the first pixel multiplexer 22 for receiving the signal Src or the zero value signal therefrom. A divisor generator 31 is connected to the comparator 36 of the first pixel multiplexer 22 for receiving the first comparison signal Sc1 therefrom.

Since each of the pixel multiplexers 23, 27, and 28 has a construction identical to that of the pixel multiplexer 22, as described above, the operation thereof is substantially the same. Therefore, only the portions of multiplexers 23, 27, and 28 different from the first multiplexer 21 are described below.

The second pixel multiplexer 23 is connected to the first line memory 18, the second register 24, the summation unit 29, and the divisor generator 31, as shown in FIG. 14. Similarly, the second pixel multiplexer 23 produces a second comparison signal Sc2, and outputs the first delayed pixel data Srl or the zero value signal according to the second comparison signal Sc2.

The third pixel multiplexer 27 is connected to the second line memory 19, the second register 24, the summation unit 29, and the divisor generator 31. Similarly, the third pixel multiplexer 27 produces a third comparison signal Sc3, and outputs the sixth delayed pixel data Srl'c or the zero value signal according to the third comparison signal Sc3.

The fourth pixel multiplexer 28 is connected to the third register 25, the second register 24, the summation unit 29, and the divisor generator 31. Similarly, the fourth pixel multiplexer 28 produces a fourth comparison signal Sc4, and outputs the fifth delayed pixel data Srl' or the zero value signal according to the third comparison signal Sc4.

Thus, the divisor generator 31 receives the four comparison signals Sc1, Sc2, Sc3, and Sc4 from the four pixel multiplexers 22, 23, 27, and 28, respectively. Based on these four signals, the divisor generator 31 produces a divisor signal Sdv.

Figures 16, 17:
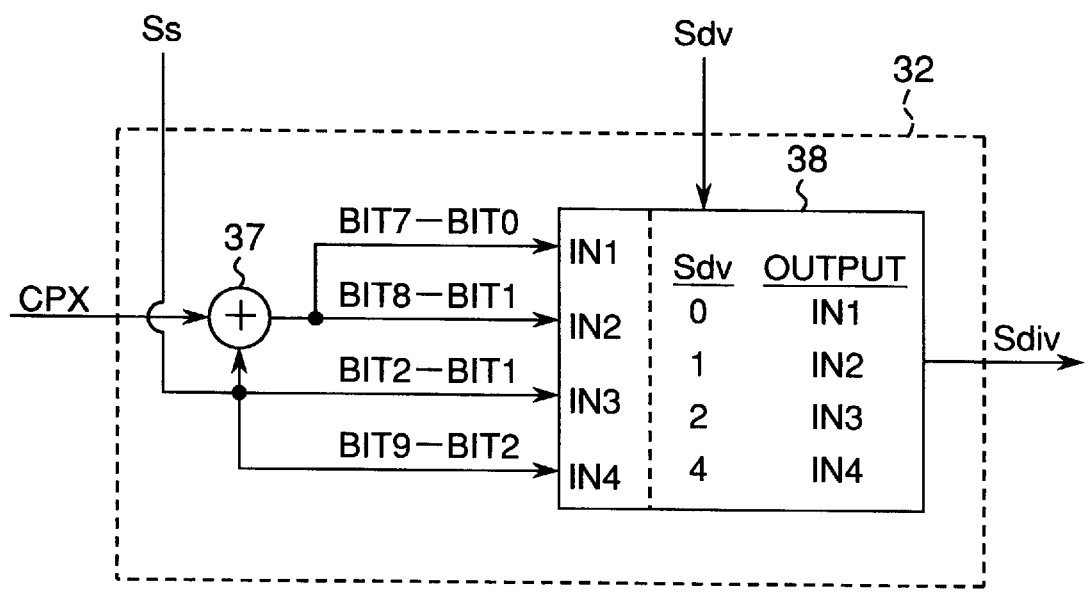
FIG. 16 is a table showing the decoding logic for a divisor generator incorporated in the ringing noise filter of FIG. 14, with respect to input data selected by the pixel selectors of FIG. 15.
FIG. 17 is a block diagram showing a divider incorporated in the ringing noise filter of FIG. 14.
Figure 18:
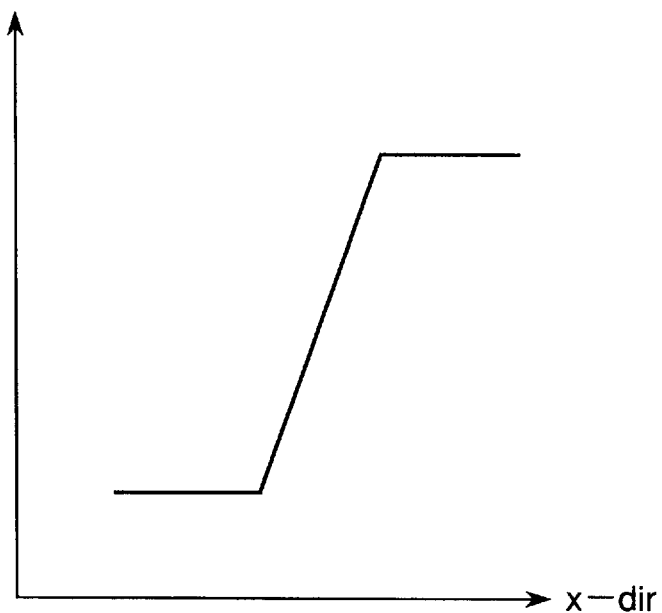
FIG. 18 is graph showing a waveform of an original video data frequency response at an object's edges prior to compression and reconstruction.
Figure 19:
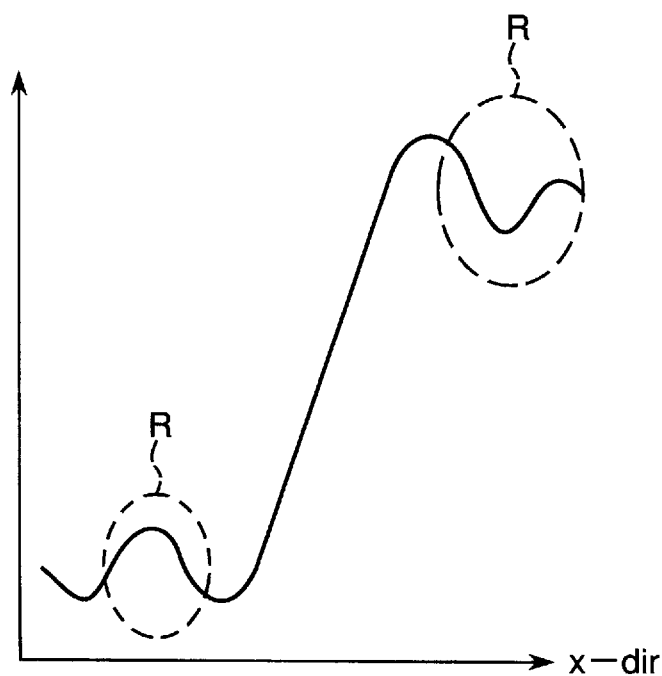
FIG. 19 is a graph showing a waveform of video data that is reconstructed from the video data of FIG. 18.

Referring to FIG. 16, a logic table of the divisor generator 31 is shown. Since each of comparison signals Sc1, Sc2, Sc3, and Sc4 can be "0" or "1" as described above, a summed value Scs of the four comparison signals Sc1, Sc2, Sc3, and Sc4 becomes either of numbers "0", "1", "2", "3", or "4". When the summed value Scs is "0", the divisor generator 31 outputs a "1" as the divisor Sdv. Similarly, when the summed value Scs is "1", "2", and "3, or 4", the divisor Sdv is set to "1", "2", or "4", respectively.

Also, the summation unit 29 receives the pixel data Src (or zero), Srl (or zero), Srl'c (or zero), and Srl' (or zero) from the multiplexers 22, 23, 27, and 28, respectively, and sums thereof up to produce a summation signal Ss.

A divider 32 is connected to the summation unit 29, the divisor generator 31, and the second register 24 for receiving the summation signal Ss, the divisor signal Sdv, and the center pixel signal CPX, respectively, therefrom. Based on these three signals, the divider 32 produces a division signal Sdiv.

Referring to FIG. 17, details of the divider 32 are shown. The divider 32 includes an adder 37 and a dividing computer 38 connected to each other as shown. The adder 37 is connected to the second register 24 and the summation unit 29 for receiving and adding the center pixel signal CPX and the summation signal Ss, respectively, therefrom.

The dividing computer 38 has four input ports IN1, IN2, IN3, and IN4. The input ports IN1 and IN2 are connected to the adder 37 for receiving the added signal CPX and Ss therefrom. The input ports IN3 and IN4 are connected to the summation unit 29 for receiving the summation signal Ss therefrom. The dividing computer 38 selects one of signals that are taken therein through the input ports IN1, IN2, IN3, and IN4 based on the divisor signal Sdv, and further outputs the selected signal therefrom as the division signal Sdiv.

Within the block of the dividing computer 38, the dividing logic thereof is schematically shown. When the divisor signal Sdv is "0", the signal input through the input port IN1 is selected and outputed as the division signal Sdiv. Similarly, the divisor signals Sdv is "1", "2", or "4", the input signals through the ports IN2, IN3, and IN4 are output, respectively, from the divider 32. Thus, depending on the divisor signal Sdv from the divisor generator 31, the selected bits from either the adder 37 or the summation 29 will be outputted from the divider 32.

Referring back to FIG. 14, a circular buffer controller 20 is connected to the status memory 3, the controller operates based on a vertical synchronization signal V. Sync. supplied thereto. The circular buffer controller 20 generates a read signal $S_{RD}$ including the memory address and reading command so as to read the second detection level signal $S_{DS2}$ from the status memory 3 as well as to keep track of the position of the pixel being filtered.

A data multiplexer 30 is connected to the status memory 3 (FIG. 11), the second register 24, and the divider 32 for receiving the second detection level signal $S_{DS2}$, the central pixel signal CPX, and the division signal Sdiv, respectively, therefrom. The data multiplexer 30 multiplexes the division signal Sdiv with the central pixel data CPX by the second detection level signal $S_{DS2}$.

Thus, the data multiplexer 30 will output the data Sdiv from the divider 32 when the detection level (or status) signal $S_{DS2}$ indicates the presence of ringing noise within that pixel (CPX) boundaries or else the pixel value remains unchanged from, prior to the previous value (i,e., the input of the ringing noise filter 5). The data that is outputted by the multiplexer 30 will then be the final output of the ringing noise filter 5, and is the filtered pixel data $S_F$.

As is apparent from the above descriptions, the ringing noise removing apparatus of the present invention is capable of maintaining the reconstructed video sharpness while removing the ringing noise effect from the reconstructed video by detecting the sources causing such noise and applying an adaptive filter to the detected areas. Also, according to the present invention, complex mathematical calculations are not necessary, and only an independent process is required. Thus, the present invention is fairly easy to implement in conjunction with a video decoder (or decompressor). Hence, the apparatus of the present invention has a large effect in the removal of the ringing noise from reconstructed video at a low cost and minimal complexity.

By the above described configuration, the ringing noise removing apparatus reads in the reconstructed digital video data in a block by block basis from the decompressor (or decoder). Each block is then detected for the high frequency areas which are a potential source of the ringing noise. The frequency levels detected depend on the detection threshold which can be adjusted. The block detection status generated is then stored. This detection status is used for filtering control.

In the meantime, the reconstructed video data is converted from a block format into raster scan through the reorder memory. After the pixel data is converted to raster scan, the data is outputted to the ringing noise filter. The pixel to be filtered is assumed to be in the center of a 3×3 matrix. All the pixels within the matrix are then compared with an adjustable threshold. Pixels within a certain range are then selected for the computation of the filter result. Using the pixels selected, the filter result of the particular pixel is then calculated. The filtered pixel is then multiplexed with the original pixel using the detection status which was stored earlier. The detection status acts as the control for the multiplexing to produce the final output from the apparatus.

Although the present invention has been fully described in connection with the preferred embodiments thereof with reference to the accompanying drawings, it is to be noted that various changes and modifications are apparent to those of ordinary skill in the art. Such changes and modifications are to be understood as being included within the scope of the present invention unless they depart therefrom.

What is claimed is:

1. A video signal decoding apparatus for decoding a coded bit stream of video signals which comprises blocks of quantized coefficient data and which is produced by encoding an input video signal, said apparatus comprising:

a variable-length and run-length decoding means for variable-length and run-length decoding the coded bit stream to reconstruct the blocks of quantized coefficient data;

an inverse quantization means for inverse quantizing the reconstructed blocks of quantized coefficient data;

an inverse coding means for exclusively applying inverse DCT to the inverse quantized blocks of quantized coefficient data to produce decoded blocks which comprise both edge blocks and non-edge blocks;

an edge block detection means for determining whether each of the decoded blocks is an edge block; and an adaptive edge enhancement filter means for removing distortions from individual decoded blocks when said edge block detection means determines that a respective decoded block is an edge block.

2. The video signal decoding apparatus of claim 1, wherein said edge block detection means comprises:
   a first calculating means for calculating an average value of the decoded block;
   a second calculating means for calculating a maximum value and a minimum value of the decoded block;
   a third calculating means for calculating a first absolute difference value between the average value and the maximum value of the decoded block;
   a fourth calculating means for calculating a second absolute difference value between the average value and the minimum value of the decoded block; and
   a determining means for determining that the decoded block is an edge block when either the first or second absolute difference value is greater than a predetermined value, and otherwise determining that the decoded block is a non-edge block.

3. A video signal decoding and encoding apparatus for decoding a coded bit stream of video signals which comprises blocks of quantized coefficient data and which is produced by encoding an input video signal using an encoding apparatus, wherein;
   said encoding apparatus comprises:
      a partitioning means for partitioning each frame of the input video signal into smaller blocks of pixel data;
      a transform coding means for transforming the partitioned blocks of pixel data into blocks of transformed coefficient data;
      a quantization means for quantizing the transformed coefficients data to produce quantized coefficient data; and
      a variable-length and run-length coding means for variable-length and run-length coding the quantized coefficient data to produce the coded bit stream;
   said decoding apparatus comprises:
      a variable-length and run-length decoding means for variable-length and run-length decoding the coded bit stream to reconstruct the blocks of quantized coefficient data;
      an inverse quantization means for inverse quantizing the reconstructed blocks of quantized coefficient data;
      an inverse coding means for [transforming] exclusively applying inverse DCT to the inverse quantized blocks of quantized coefficient data to produce decoded blocks which comprise both edge blocks and non-edge blocks;
      an edge block detection means for determining whether each of the decoded blocks is an edge block; and
      an adaptive edge enhancement filter means for removing distortions from individual decoded blocks when said edge block detection means determines that a respective decoded block is an edge block.

4. The video signal decoding and encoding apparatus of claim 3, wherein said edge block detection means comprises:
   a first calculating means for calculating an average value of the decoded block;
   a second calculating means for calculating a maximum value and a minimum value of the decoded block;
   a third calculating means for calculating a first absolute difference value between the average value and the maximum value of the decoded block;
   a fourth calculating means for calculating a second absolute difference value between the average value and the minimum value of the decoded block; and
   a determining means for determining that the decoded block is an edge block when either the first or second absolute difference value is greater than a predetermined value, and otherwise determining that the decoded block is a non-edge block.

5. The video signal decoding and encoding apparatus as in claim 3, wherein said adaptive edge enhancement filter means comprises:
   an adaptive averaging filter mask for performing convolution on a pixel by pixel basis for decoded blocks that are classified as edge blocks by comparing a difference between every adjacent pixel of the pixel being convolved with a predetermined value and averaging the pixel being convolved by the adjacent pixel when the difference is determined to be smaller than the predetermined value.

6. The video signal decoding and encoding apparatus as in claim 3, wherein;
   said encoding apparatus further comprises:
      a first motion compensation means for removing temporal redundancies in the partitioned blocks before being transformed by said transform coding means; and
   said decoding apparatus further comprises:
      a second motion compensation means for performing an inverse motion compensation of the reconstructed blocks before being processed by said edge block detection means.

* * * * *